Aug. 7, 1951 L. P. CROSMAN ET AL 2,563,102

DIGIT INDICATOR

Filed June 19, 1948 5 Sheets-Sheet 1

INVENTORS
LORING P. CROSMAN
WILLIAM H. HENRICH
BY Thomas S. Ross
Ralph W. E. Bitner
ATTORNEYS.

DIGIT INDICATOR

INVENTORS
LORING P. CROSMAN
WILLIAM H. HENRICH
BY Thomas S. Ross
Ralph W. E. Bitner
ATTORNEYS.

INVENTORS
LORING P. CROSMAN
WILLIAM H. HENRICH
BY Thomas S. Ross
Ralph W. E. Bitner
ATTORNEYS.

Aug. 7, 1951 L. P. CROSMAN ET AL 2,563,102

DIGIT INDICATOR

Filed June 19, 1948 5 Sheets-Sheet 4

INVENTORS
LORING P. CROSMAN
WILLIAM H. HENRICH
BY Thomas S. Ross
Ralph W. E. Bitner
ATTORNEYS.

INVENTORS
LORING P. CROSMAN
WILLIAM H. HENRICH
BY Thomas S. Ross
Ralph W. E. Bitner
ATTORNEYS.

Patented Aug. 7, 1951

2,563,102

UNITED STATES PATENT OFFICE 2,563,102

DIGIT INDICATOR

Loring P. Crosman, Darien, and William H. Henrich, East Norwalk, Conn., assignors to Remington Rand Inc., New York, N. Y., a corporation of Delaware Application June 19, 1948, Serial No. 33,947

4 Claims. (Cl. 235—92)

This invention relates to digit indicators of the gaseous discharge type and has particular reference to small neon lamps used as indicators in conjunction with electronic calculator systems. This application contains matter divided from a copending application, Serial No. 18,782 filed April 3, 1948, and now Patent No. 2,512,851, issued June 27, 1950.

As used throughout the specification, the term "unbalanced trigger" refers to a trigger stage comprising two electronic triodes with circuit components so adjusted that the circuit is stable only when one triode is conducting and the second triode is non-conducting. Applying an actuating pulse to such a stage momentarily switches conductivity and generates a pulse, the duration of which depends upon the circuit constants. This type of circuit is also called a "one-shot multivibrator" and a "flip-flop."

Mechanical calculators and some electronic calculating devices generally accumulate digit values in conformity with the decimal or denary system of notation; that is, numbers are received in one demoninational order up to nine, then the addition of a unit value "carries" or enters a one in the next higher order and returns the first order value to zero. Such a system has a radix of ten.

In order to save tubes and equipment, the present invention uses two accumulators for each denominational order, one with a radix of two and the other with a radix of five. The radix-of-two accumulator carries every second actuation to the radix-of-five accumulator and the radix-of-five accumulator carries every fifth actuation to the radix-of-two accumulator in the next higher order of the denary system.

Indicator lamps have been used in calculator circuits to indicate the presence of current and in denary systems to indicate the value of the number in an accumulator. The present invention uses neon indicator lamps connected to the radix-of-two stages and the radix-of-five stages in such manner as to decode the values accumulated therein and show the result in the denary system.

It is an object of the invention, therefore, to provide an improved indicating lamp circuit which will decode and translate the values received from a coded system and indicate their value in the denary system.

Another object of the invention is to provide a system of decoding and indicating which consumes a small amount of power and uses little space for installation.

Another object of the invention is to provide a system of value indication which has negligible time lag.

The invention comprises a series of ten gaseous discharge lamps, each lamp having two electrodes and each of the ten lamps designating a digit from 0 to 9, inclusive. One electrode of each lamp is connected to the radix-of-two accumulator and the other electrode is connected to the radix-of-five accumulator.

An alternate form of the invention comprises a series of ten gaseous discharge lamps, each lamp having two electrodes and each of the ten lamps designating a digit. One electrode of each lamp is connected to a battery or other source of potential supply and the other electrode of each lamp is connected to the midpoint of a voltage divider, the ends of which are connected to the radix-of-two accumulator and the radix-of-five accumulator.

For a better understanding of the present invention, together with other and further objects thereof, reference is made to the following description taken in connection with the accompanying drawings.

Figs. 2 and 3 are to be combined to show the complete system.

Figure 1:
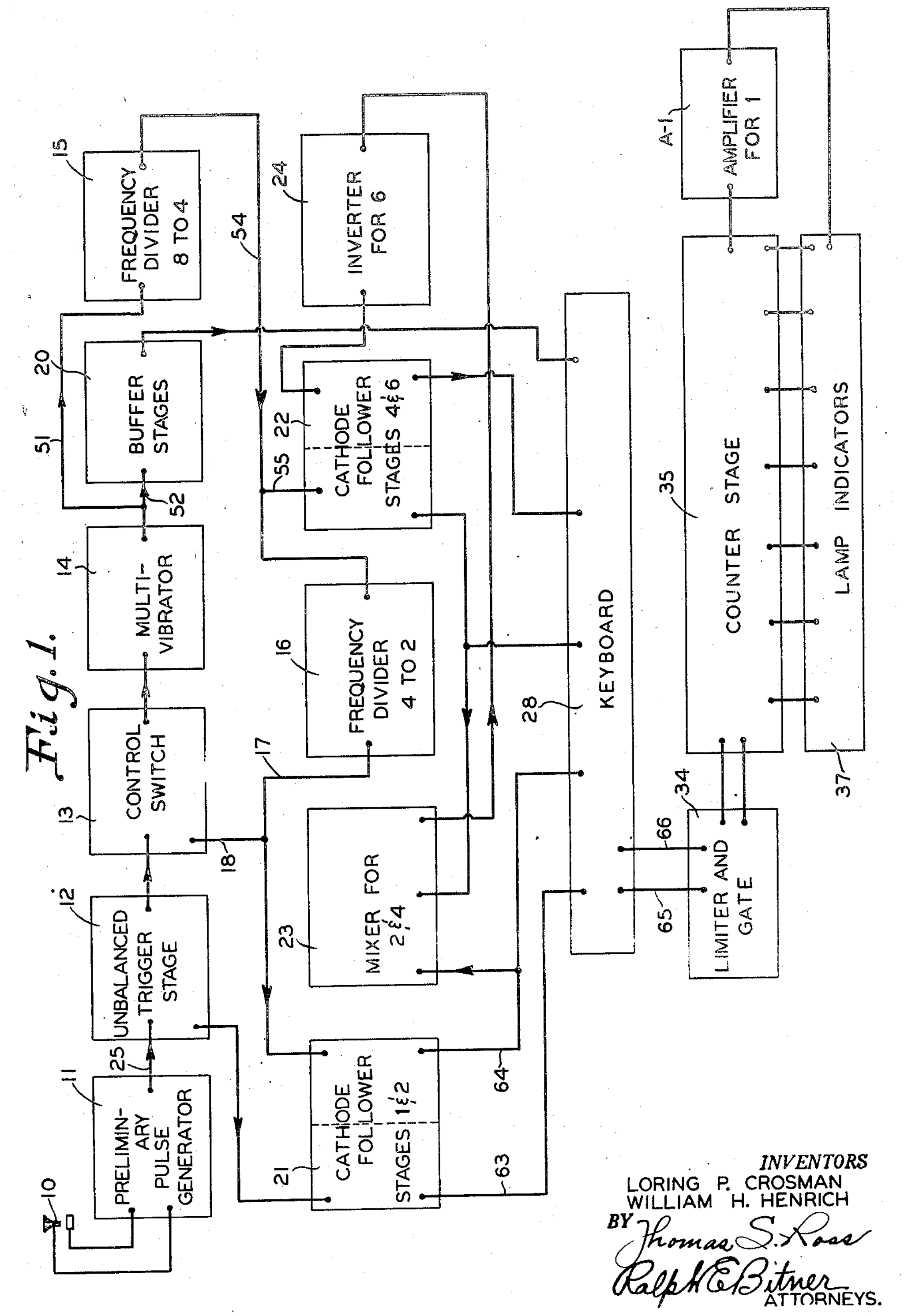
Fig. 1 is a block diagram showing how the various stages are connected.

Referring now to Fig. 1, the entire system will be generally described, neglecting at present the detailed features of the invention. A starting key 10 is connected to a preliminary pulse generator 11 which generates a sharp pulse when the key contacts are made. Next an unbalanced trigger stage 12 transforms the sharp pulse into a broad flat-topped pulse of the same magnitude and duration as the pulses which later are generated by the multivibrator. The unbalanced trigger stage 12 also controls an electronic switching stage 13 which turns a multivibrator oscillator 14 on. The switching stage 13 is also operated, but in a reverse direction, by a frequency divider stage 16 to turn the multivibrator off.

Figure 6:
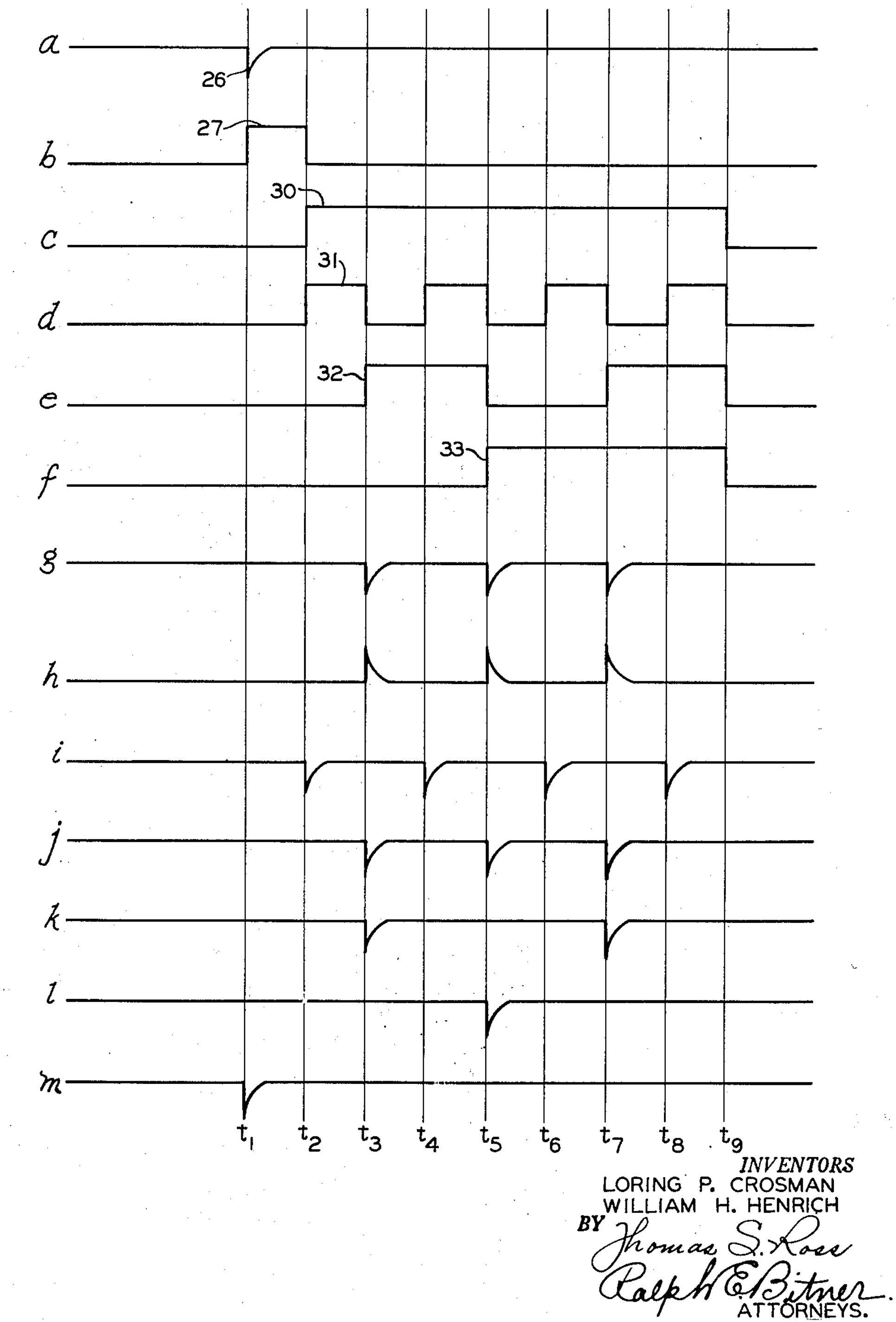
Fig. 6 is a series of graphs showing the character of the pulses generated and produced in various parts of the circuit.

The output of the multivibrator, in this example equal to four pulses, is fed to a frequency divider 15 which reduces the four pulses to two (see Fig. 6—*e*), and these two pulses are fed to a second frequency divider 16 which reduces the number to one (Fig. 6—*f*). The output of this divider is fed back over conductors 17 and 18 to the switching stage to turn off the multivibrator when the single pulse ends.

During the process, above described, of generating a single starting pulse and four oscillation pulses, there are made available at various portions of the circuit, single, double, and quadruple pulse trains which may be used singly or in combination to produce sharp pulse trains to count from one to nine. To this end three buffer stages 20, 21 and 22 are provided, also a mixer stage 23 and an inverter 24.

The pulses which are provided from the above described circuit are indicated graphically in Fig. 6 where voltages are plotted against time. The first pulse, started by the actuation of key 10, and transferred by conductor 25, is shown graphically by a sharp negative pulse 26 which occurs at the start of the operation cycle. The output of the unbalanced trigger stage 12 is a flat-topped pulse 27 which is tapped by a buffer cathode follower stage 21 and delivered to a keyboard switching assembly 28. The output of the control switching stage 13 is shown in Fig. 6—*c* as a long flat-topped wave 30 which must attain its maximum value before the multivibrator can function.

The graph of the multivibrator pulses 31—*d* shows the square topped waves usually produced by such a circuit. Waves 32 and 33 (Fig. 6—*e* and *f*) produced by the two frequency divider circuits are shown in their time relation to the starting pulses, indicating that the voltage fall in the applied wave is the controlling action which switches conduction in each divider stage.

Referring again to Fig. 1, the keyboard 28 contains ten manually settable switches which designate and control the number and value of the pulses transmitted to an accumulator circuit. If the number to be transmitted is even, a series of pulses is applied to the radix-of-five stages, the number of pulses being equal to half of the number to be accumulated. If the number to be accumulated is one, the keyboard switching circuit sends a single pulse to the radix-of-two stage. If the number to be accumulated is odd and greater than one, a single pulse is sent to the radix-of-two stage and one or more pulses are sent to the radix-of-five stages.

The assembly of counter stages 35 may be connected in parallel with other stages for counting, carrying, or shifting, depending upon the problem to be solved.

Figures 3, 4:
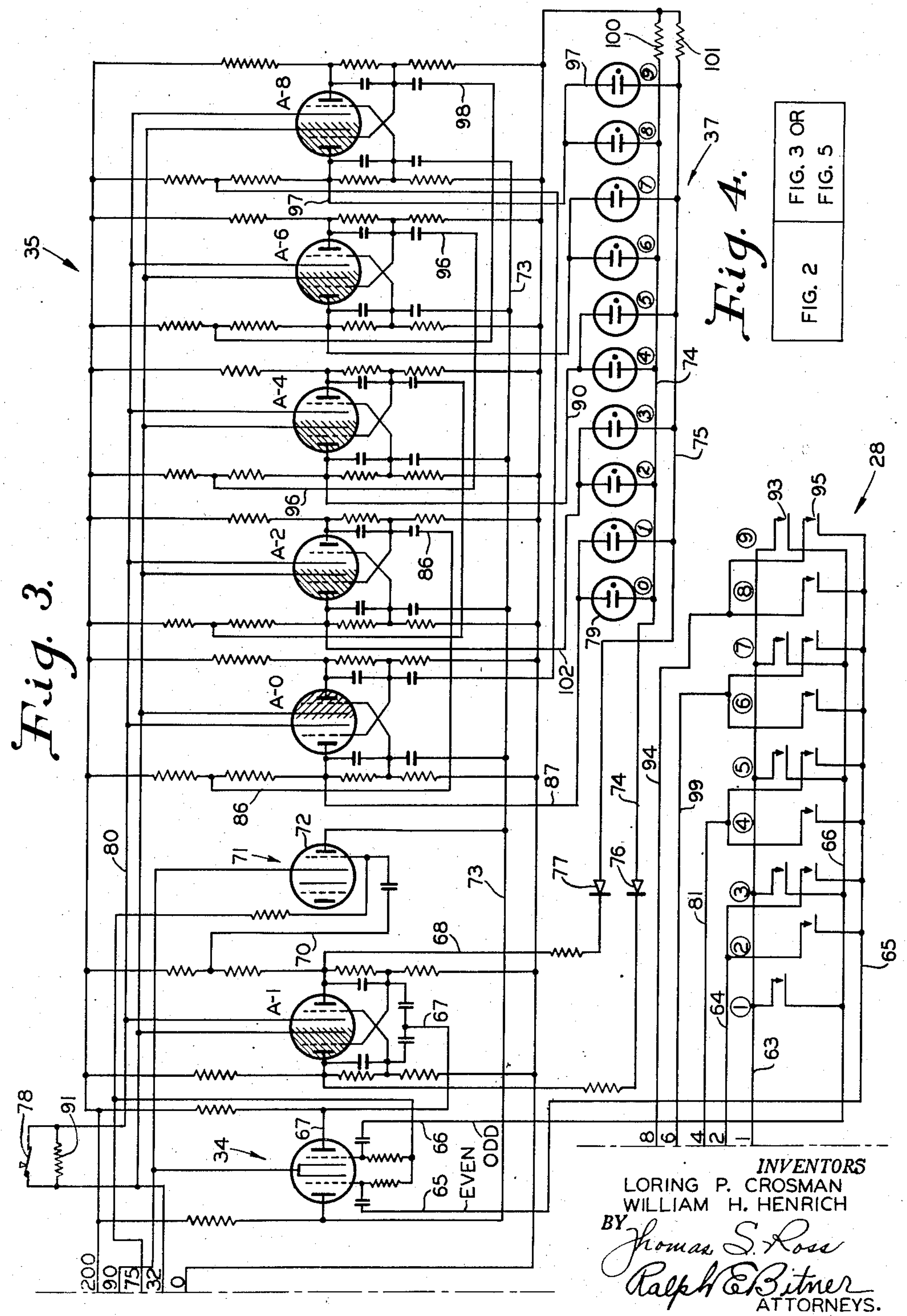
Fig. 3 is a schematic diagram of connections of the remaining part of the pulse system.
Fig. 4 is a diagram which indicates how
Figure 5:
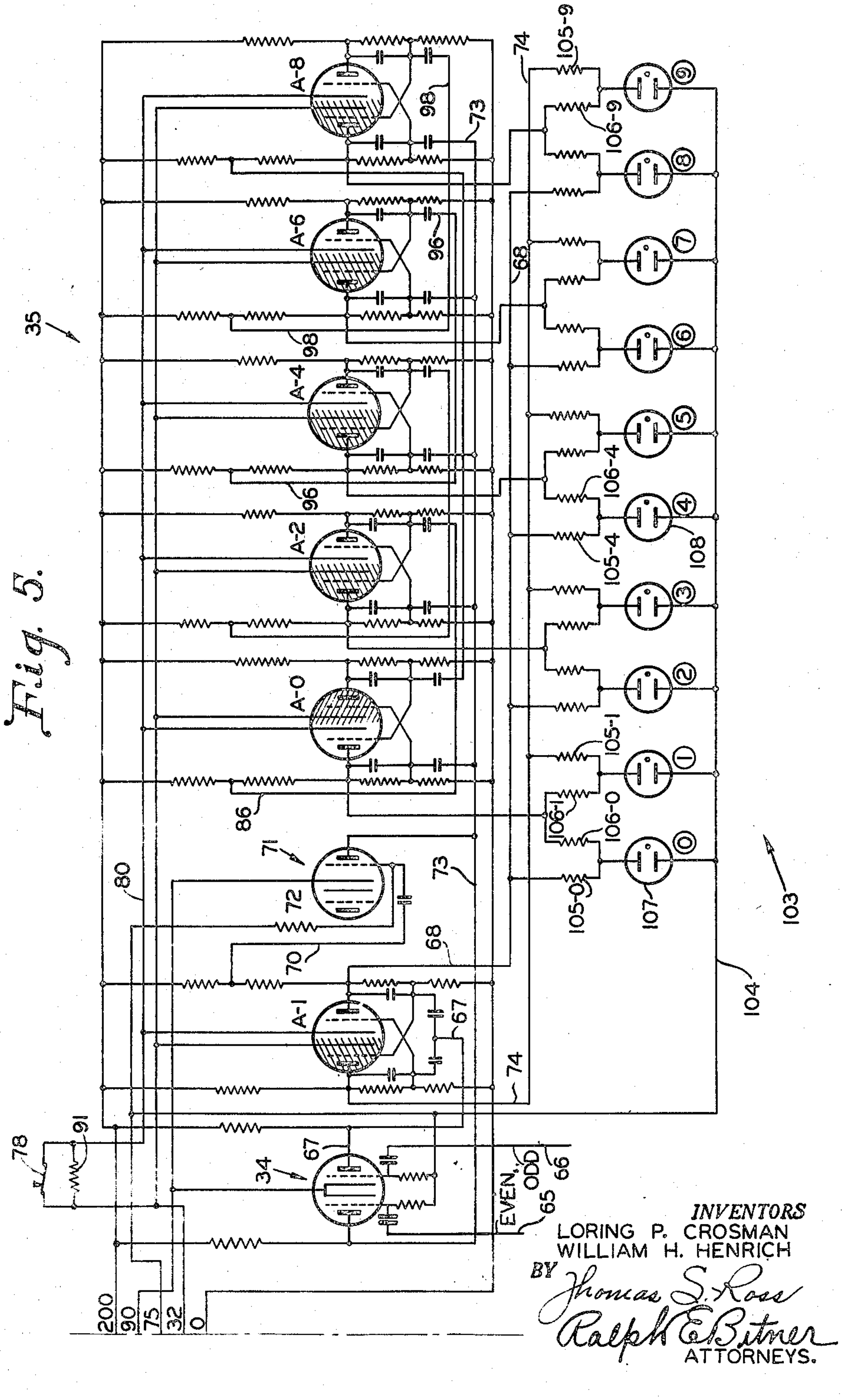
Fig. 5 is a schematic diagram of connections similar to Fig. 3 but showing an alternate manner of connecting the neon indicator lamps.

Having now described the general system of pulse generation and counting, specific reference is made to Figs. 3, 5 and 6 which show the counter stages in detail and show two forms of neon lamp indicator circuits.

Figure 2:
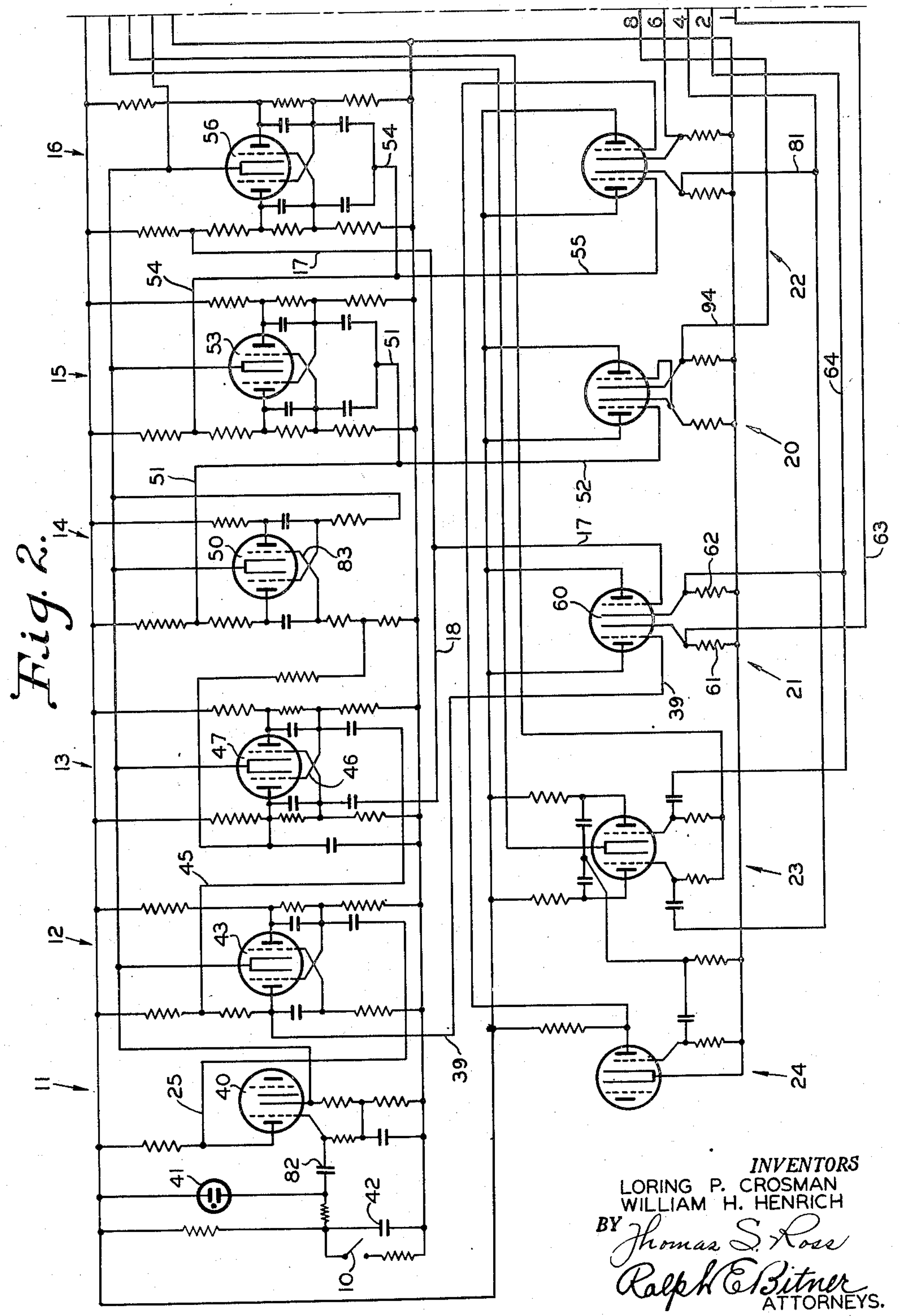
Fig. 2 is a schematic diagram of connections of part of the pulse or generating system.

For a detailed explanation of the pulse generation circuits shown in Fig. 2, reference is made to the above mentioned copending application, Serial No. 18,782 filed April 3, 1948. The generating stages, those shown in Fig. 2, produce a series of pulses each time the key 10 is closed. A single pulse is sent over conductor 63 to key number 1 in the keyboard 28; a single pulse is also sent over conductor 64 but occuring at a different time than the first pulse; a double pulse (Fig. 6—*e*) is sent over conductor 81 to keys number four and five; a triple pulse is sent over conductor 89 to keys number six and seven; and four pulses are sent over conductor 94 to keys number eight and nine.

The bank of nine keys in the keyboard 28 are arranged so that the depression of an even numbered key will send one, two, three or four pulses to an amplifier stage 34 which in turn sends the pulses over a conductor 73 to all the stages of the radix-of-five accumulator, A—0 to A—8. When an odd numbered key is depressed the same pulses are sent to the radix-of-five accumulator and in addition a single pulse is sent to the radix-of-two accumulator which comprises a double triode tube A—1.

The amplifier stage 34 is normally adjusted with its control electrodes below the conducting point so that only positive pulses will cause conduction in the anode circuit. A negative pulse has no effect on the tube conductivity. The left-hand side of stage 34 receives a pulse whenever an even designated key is depressed, the right-hand side is pulsed whenever the "one" key is depressed, and both sides are pulsed whenever the 3, 5, 7, or 9 keys are depressed.

The odd or right-hand section of stage 34 has its output connected to trigger stage A—1 which is normally conducting on the left hand side. A positive pulse transmitted over conductor 66 produces a negative pulse in anode conductor 67 and actuates stage A—1, transferring the conducting path within the tube to the right-hand side. This lowers the potential of conductors 68 and 70 and delivers a negative pulse to the control electrode of tube 72 in an amplifier stage 71. Stage 71 acts as a buffer amplifier and inverter, the anode being connected directly to conductor 73 which in turn is connected to all the right-hand control electrodes of a series of five trigger stages. These five stages represent the radix-of-five accumulator and record the even numbered digits in the decimal system. They are designated A—0, A—2, A—4, A—6, and A—8 to indicate the values handled by them. The A—0 stage has part of its output connected to the left-hand control electrode of the A—2 stage; the output of the A—2 stage is connected to the left-hand control electrode of the A—4 stage; the A—4 and A—6 stages being similarly connected, and the A—8 stage output connected back to the control electrode of the A—0 stage.

Each of the five stages, A—0 to A—8, inclusive, has the output of its left-hand section connected to one terminal of two neon indicator lamps in the indicator bank 37. The other terminals of the lamps are connected by conductors 74 and 75 to rectifier elements 76 and 77 and thence to the two anodes in stage A—1.

Rectifier elements 76 and 77 may be diodes in which case no further circuit connections are necessary. However, to save space and cost crystal rectifiers of the germanium type are used and these permit a small back current to flow. To keep this current from lighting any of the indicator lamps, large resistors 100 and 101 are connected between the rectifiers and ground.

From the foregoing description it will be obvious that current which lights the indicator lamps flows from one of the two anodes in the radix-of-two counter, through any one of the ten lamps, then to one of the five anodes in the radix-of-five counter. The back flow of current could be blocked equally well by the use of five rectifiers in the connections to the radix-of-five counter and in this case five resistors would be connected between the rectifiers and ground.

A zeroize or normalizing key 78 is included in series with one of the cathode conductors 80 so that its opening will insert a resistance 91 in series with all the cathodes that normally should be non-conducting.

*Operation*

In order to describe the operation, let it first be assumed that the circuit is in its normal or quiescent state and that no numbers have been entered into either of the two counters. Stages A—1, A—2, A—4, A—6, and A—8 are all conducting on the left-hand side, and the A—0 stage is conducting on the right-hand side. Neon indicator lamp 79 is then lighted because one of its conductors 87 leads to the anode in stage A—0 which is at high potential and the other conductor 74 leads through rectifier 76 to the anode of stage A—1 which is at low potential. On some of the indicator lamps 3, 5, 7, and 9, a difference of potential would exist under the above conditions except for the rectifiers 76 and 77 which block all currents flowing from the A—1 stage to the lamps. One of these blocked circuits can be traced from the right-hand anode of stage A—1 which is at high potential, over conductor 68, through rectifier 77, over conductor 75 to lamp number 3, through the lamp and then over conductor 102 to the left-hand anode of stage A—2 which is at low potential.

Now assume that the number 4 key in the keyboard 28 be depressed, joining conductor 65 with conductor 81. Then the start key 10 is closed and the unbalanced trigger stage 12 produces a pulse (Fig. 6—*b*) which controls the switching stage 13 and the buffer amplifier stage 21.

The application of a pulse to tube 47 turns on the multivibrator and produces a series of pulses; one, two, three and four pulses as shown by Fig. 6—*i* to Fig. 6—*m*, inclusive. The depression of number 4 key provides a path from stage 22, which transmits a double pulse, to the even side of stage 34 over conductors 81 and 65. Stage 34 differentiates the pulses and changes the broad flat topped waves (Fig. 6—*e*) to sharp pulses (Fig. 6—*k*) which are applied to all the radix-of-five stages by way of conductor 73. The first of the two sharp pulses is applied to the right-hand control electrode of all five tubes A—0 to A—8 but only the A—0 tube is affected since it is the only tube conducting on the right. The first pulse causes stage A—0 to change conduction to the left-hand anode and in doing so a pulse is sent over conductor 86 to the left-hand control electrode of the A—2 which causes it to be actuated, shifting the conduction to the right-hand side. When the second pulse arrives at the counter stages by way of conductor 73, the A—0 stage is conducting on the left and the A—2 stage is conducting on the right, hence only the A—2 stage is affected. Its conductance is transferred to the left and in the transfer a pulse is sent to the A—4 stage which actuates it and changes the conductance to the right-hand anode. Hence, at the end of the double pulse only the A—4 stage is conducting on the right. This condition causes the number 4 neon indicator lamp to light since one of its conductors 90 leads to the left-hand anode of stage A—4 which is now at high potential while the other conductor 74 leads to the left-hand anode of stage A—1 which is at low potential.

If the number five key had been depressed instead of the number four key, the action would have been the same as far as the A—0 to A—8 stages are concerned, but in addition a connection would have been made between conductor 63 and conductor 66 and a single pulse, transmitted from the left-hand side of tube 60, is applied to the right-hand control electrode of stage 34 and this pulse is amplified and sent to stage A—1 by conductor 67. Stage A—1 is thereby actuated and the conductance transferred to the right-hand anode reducing it to low potential.

Indicator lamp number 5 will now be lighted because the potential change in the A—1 stage has transferred the low potential value from conductor 74 to conductor 75.

After the finish of the pulsing cycle the counter stages 35 and the indicator lamps remain in their operated condition so that they may be ready for additional pulses or until the result may be copied or transferred to another part of the calculator system. When it is desired to normalize the system and return the counter stages to zero condition, the switch 78 is opened. When this is done, a resistance 91 is placed in series with conductor 80 which connects with all the cathodes that are non-conducting when the device reads zero. If the cathodes are in a conducting condition, the added resistance causes a potential drop in the cathode supply line which reduces the potential difference between the cathode and the control electrode to a value where the anode current is completely cut off. The same action increases the voltage of the control electrode in the non-conducting half of the stage until it reaches the conducting state.

Referring now to Fig. 5, an alternate system of indicating lamps is shown in cooperation with the same system of counter stages as was shown in Fig. 3. A bank of ten lamps 103, designated from 0 to 9 is arranged with one terminal from each lamp connected to a common conductor 104 which runs to the 75 volt tap on the direct current power supply. The other terminals on the lamps are each connected to the mid-point of a voltage divider composed of two resistors 105 and 106. The end points of each of the ten voltage dividers are connected to anodes in the A—1 stage and A—0 to A—8 stages. The even designated positions 0, 2, 4, 6, and 8 have one resistor 105 connected to conductor 68 which leads to the right-hand anode of the A—1 stage. All the odd positions have one resistor 105 connected to conductor 74 which leads to the left-hand anode of stage A—1. The other resistors 106—0 to 106—9 are connected to the left-hand anodes in the radix-of-five counter.

The circuit is arranged so that when an anode is non-conducting, the voltage at the anode is 160 volts. When the anode is conducting, the voltage drops to 60 volts. When these voltages are measured with respect to a 75 volt line, such as conductor 104, the values become −15 and 85 volts.

A voltage divider 105, 106 connected between two anodes that are in the conducting condition will obviously make one terminal of the indicator lamp 107 −15 volts and the lamp will not be lighted. If one of the anodes is made non-conducting, the center point of the voltage divider will assume a voltage which is the average value between −15 and 85 or 35 volts. The indicator lamp will not light because the breakdown potential of commercial neon discharge lamps is approximately 75 volts. If both ends of the voltage divider are connected to non-conducting anodes, the ends and the center point all are at the same potential, 85 volts, and the indicator lamp will be lighted.

In the normal or quiescent state when the counter stages have received no counting pulses, the radix-of-two counter A—1 is conducting on the left, and the radix-of-five counters are all conducting on the left except the A—0 stage which is conducting on the right. The zero designating lamp 107 will be lighted because the end of one resistor 105—0 is connected to the non-conducting anode of A—1 and the end of the other resistor 106—0 is connected to the non-conducting anode of stage A—0. All the odd numbered lamps except 1 are connected to anodes, both of which are at their low potential, and the lamps 1, 2, 4, 6, and 8 are connected to anodes, one of which is at high potential and one of which is at low potential. These lamps are not lighted.

Let it be assumed now that a double pulse has been transmitted to the counter to indicate the value of four. As explained above, the first three stages in the radix-of-five counter will be actuated, resulting in the A—0 and A—2 stages conducting on the left and the A—4 stage conducting on the right. Then the number four lamp 108 will be lighted because resistor 105—4 is connected to the non-conducting anode in stage A—1 and the resistor 106—4 is connected to the non-conducting anode in stage A—4. Both these anodes are at high potential and provide the necessary voltage to ionize the lamp.

If a one is to be added to the four in the counter, a single pulse is sent to the radix-of-two stage A—1, and its conductance will be changed to the right-hand anode. This will extinguish the number four lamp since the high potential on resistor 105—4 has been reduced to a low potential. The number five lamp will be lighted since both ends of the associated voltage divider are connected to non-conducting anodes.

From the above description, it will be evident that the series of indicator lamps, when connected to the counter stages in the manner disclosed, will give a true indication of the value of the amounts in the counter.

While there have been described and illustrated, specific embodiments of the invention, it will be obvious that various changes and modifications may be made therein without departing from the field of the invention which should be limited only by the scope of the appended claims.

What is claimed is:

1. A gaseous discharge lamp indicator for indicating digit values in an electronic accumulator having a radix-of-five counter and a radix-of-two counter, comprising; a series of ten diode gaseous discharge lamps; a series of ten voltage dividers for supplying the lamp indicators with current; an electrical connection between a source of potential and one electrode of all the lamp indicators; electrical connections between the mid-point of each voltage divider and the other electrode of each of the lamp indicators; electrical supply circuits for the terminals of the voltage dividers which include, a connection between one terminal of the radix-of-two counter and one terminal of half of the voltage dividers, a connection between a second terminal of the radix-of-two counter and one terminal of the other half of the voltage dividers, and a connection from each stage in the radix-of-five counter to two voltage dividers.

2. A gaseous discharge lamp indicator for indicating digit values in an electronic accumulator having a radix-of-five counter and a radix-of-two counter, comprising; a series of ten diode gaseous discharge lamps, each designated by a digit from zero to nine; a series of ten voltage dividers, each designated by a digit from zero to nine, for supplying the lamp indicators with current; an electrical connection between a source of potential and one electrode of all the lamp indicators; electrical connections between the mid-point of each voltage divider and the other electrode of the like designated lamp indicator; electrical supply circuits for the terminals of the voltage dividers which include, a connection between one terminal of the radix-of-two counter and one terminal of all the even designated voltage dividers, a connection between a second terminal of the radix-of-two counter and one terminal of all the odd designated voltage dividers, and a connection from each stage in the radix-of-five counter to two voltage dividers.

3. A gaseous discharge lamp indicator for indicating digit values in an electric accumulator having a radix-of-five counter and a radix-of-two counter, comprising; a series of ten diode gaseous discharge lamps, each designated by a digit from zero to nine; a series of ten voltage dividers, each designated by a digit from zero to nine, for supplying the lamp indicators with current; an electrical connection between a source of potential and one electrode of all the lamp indicators; electrical connections between the mid-point of each voltage divider and the other electrode of the like designated lamp indicator; electrical supply circuits for the terminals of the voltage dividers which include, a connection between one terminal of the radix-of-two counter and one terminal of all the even designated voltage dividers, a connection between a second terminal of the radix-of-two counter and one terminal of all the odd designated voltage dividers, and a connection from each stage in the radix-of-five counter to two voltage dividers, one of the voltage dividers having a designation the same as the connected stage and the other voltage divider having a designation the same as the stage plus one.

4. A gaseous discharge lamp indicator for indicating digit values in an electric accumulator having a radix-of-five counter and a radix-of-two counter, comprising; a series of ten diode gaseous discharge lamps, each including two electrodes and each designated by a digit from zero to nine; a series of ten voltage dividers, each designated by a digit from zero to nine, for supplying the lamp indicators with current, an electrical connection between a source of potential connected with the accumulator and one electrode of all the lamp indicators; electrical connections between the mid-point of each voltage divider and the other electrode of the like designated lamp indicator; electrical supply circuits for the terminals of the voltage dividers which include, a connection between one terminal of the radix-of-two counter and one terminal of all the even designated voltage dividers, a connection between a second terminal of the radix-of-two counter and one terminal of all the odd-designated voltage dividers, and a connection from each stage in the radix-of-five counter to two voltage dividers, one of which has a designation equal to the connected stage, the other of which has a designation equal to the connected stage plus one.

LORING P. CROSMAN.
WILLIAM H. HENRICH.

REFERENCES CITED

The following references are of record in the file of this patent:

UNITED STATES PATENTS

| Number | Name | Date |
|---|---|---|
| 2,179,101 | Read | Nov. 7, 1939 |
| 2,310,105 | Michel | Feb. 2, 1943 |
| 2,407,320 | Miller | Sept. 10, 1946 |
| 2,436,963 | Grosdoff | Mar. 2, 1948 |
| 2,485,825 | Grosdoff | Oct. 25, 1949 |